Figure 1:
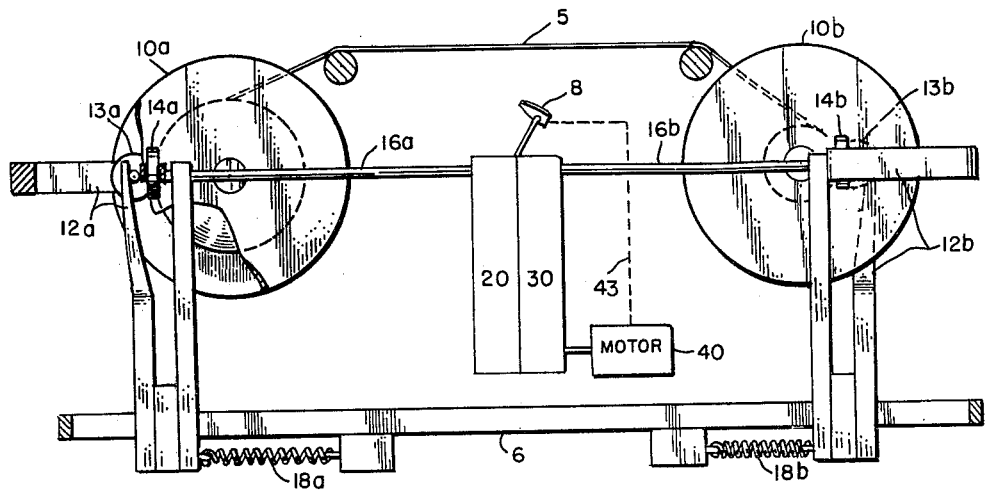

Jan. 26, 1965 S. L. THAU 3,167,265
FILM REEL DRIVE
Filed Nov. 8, 1962

INVENTOR.
SEYMOUR L. THAU
BY Harry M. Saragovitz
ATTORNEY.

United States Patent Office 3,167,265
Patented Jan. 26, 1965

3,167,265
FILM REEL DRIVE
Seymour L. Thau, Long Branch, N.J., assignor to the United States of America as represented by the Secretary of the Army
Filed Nov. 8, 1962, Ser. No. 236,462
3 Claims. (Cl. 242—55.12)
(Granted under Title 35, U.S. Code (1952), sec. 266)

The invention described herein may be manufactured and used by or for the Government for governmental purposes, without the payment of any royalty thereon.

This invention relates to reel drives and particularly to drives for transferring film from one reel to another at a constant speed and under constant tension.

Reels for winding elongated strips of flexible material are very old, and there are many different ways of using reels. There are also many ways of turning reels to wind a material, such as a tape or film, from one reel to another.

The problem here is twofold. First, the speed of the reels must be continuously varied to accommodate the change in diameter of the reel of film as it winds or unwinds, and secondly, the tension on the film must be kept constant if the winding is to be kept smooth and uniform, and spilling of the film over flanges of the reel is to be avoided.

The change in diameter of the film can be compensated for by a friction wheel drive that can be moved radially along one of the flanges of the reel, and this may be applied to both the feed reel and the take-up reel to almost perfectly control the speed of the film with relation to the reels. However, this does not allow for the inevitable variations in the mechanism or the slippage between the two reels that will be found in practice. The mechanism might be satisfactory for winding and unwinding the film in one direction, but it will probably not be satisfactory in the reverse direction.

It is therefore an object of this invention to provide an improved drive mechanism for feed and take-up reels of a film transport system.

It is a further object of this invention to provide an improved, reversible, drive mechanism, for a film or tape transport system, that maintains a constant tension on the tape between the winding and unwinding reels.

These and other objects of this invention are accomplished by simultaneously driving the winding and unwinding reels of a film transport system by means of friction wheels against the flanges of the reels. Sensing arms, in contact with the film on each of the reels, control the positions of the respective friction wheels to correspond to the diameter of the film on the reel and to vary as that diameter varies. The friction wheels are driven from the same source of rotary motion, but variable speed pulleys maintain the speed of the friction wheel on the take-up reel slightly faster than the speed of the friction wheel on the feed reel, regardless of which direction the film is being moved. The ratio of the speeds of the friction drive wheels is reversed when the direction of the film is reversed.

Figure 2:
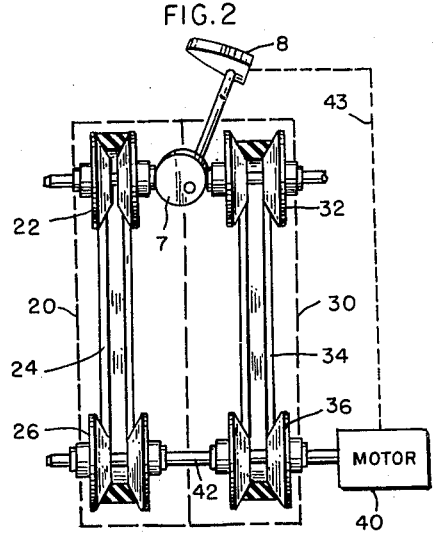
Figure 3:
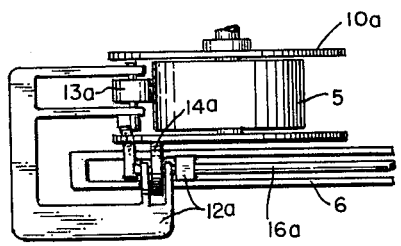

This invention will be better understood and other and further objects of this invention will become apparent from the following specification and the drawings of which FIGURE 1 is an elevation of a typical film transport system applicable to this invention;

FIGURE 2 is an enlarged elevation of a detail of FIG. 1, partially in section, representing a typical variable speed pulley drive for changing the ratios of the speeds of the friction drive wheels as the direction of the film is reversed; and FIGURE 3 is a plan view of a detail of FIG. 1, representing one of the drive mechanisms of the film transport system of FIGURE 1.

Referring now more particularly to FIGURE 1, a continuous film or tape 5 is shown in the process of being unwound from one of the reels 10a or 10b, and wound on the other.

The reels 10a and 10b are driven by friction wheels 14a and 14b respectively in contact with the flanges of the appropriate reels. The friction wheels are supported by the brackets 12a and 12b which also support the sensing wheels 13a and 13b which are in contact with the outermost layer of the film which is the effective diameter of the reel or film at any time.

The brackets 12a and 12b are slideably mounted on a guide bar such as 6 in a manner whereby the friction wheels will move in a radial direction with respect to their corresponding reel flanges.

The sensing wheels 13a and 13b are held in contact with the film on their respective reels by the pressure of springs such as 18a and 18b on the brackets 12a and 12b respectively. The same springs may also urge the friction drive wheels 14a and 14b against their corresponding flanges.

The drive wheels 14a and 14b are slideably mounted on, and are driven by, the axis 16a and 16b, which must be parallel to the guide bar 6. The axles are connected to and driven by the variable speed mechanisms 20 and 30 which, in turn, may both be driven by the same source of rotary motion or motor 40.

The ratio of the speeds of the variable speed mechanisms and the direction of motion of the film is controlled by the switch 8, which also controls the direction of rotation of the drive motor 40.

Typical, variable-speed, drive mechanisms for 20 and 30 of FIGURE 1 are shown in FIGURE 2. These consist of the variable speed pulleys 22 and 32, driven by the V belts 24 and 34, that also engage the pulleys 26 and 36 respectively, that are driven at a constant speed by the motor 40 through the drive shaft 42.

The actual change in the ratio of the speeds of the two pulleys 22 and 32 is made by means of a cam 7 coupled to the switch 8. In the one position, as shown, the flanges of the pulley 22 are urged together at the same time that the flanges of the pulley 32 are separated by turning the switch and cam 7 to the position shown. This gives the pulley 22 an effectively greater diameter than the pulley 32 and a relatively lower speed. Since the pulleys 22 and 32 are coupled, through the axles 16a and 16b to the drive wheels 14a and 14b respectively of FIGURE 1, the drive wheel 14a will be driven at a lower speed than the drive wheel 14b.

When the switch 8 is turned to its other position, not shown, the ratio of the speeds of the pulleys 22 and 32 is reversed, and, thereby, the ratio of the speeds of the drive wheels 14a and 14b is also reversed.

The switch 8 may be linked to the controls of the motor 40 in any of several obvious ways so that the direction of rotation of the motor is reversed at the same time that the position of the switch 8 is changed. This will provide a change in the relative speeds of the drive wheels corresponding to the change in direction of the rotation of the motor.

This relationship between the direction of rotation of the motor and the relative speeds of the drive wheels will insure that the speed of the friction drive wheel is always slightly greater on the take-up reel than on the feed reel regardless of which way the film is being moved. This, in turn insures a constant tension on the film between the reels, and eliminates the possibility of "spilling" the film off either of its reels due to over feeding.

FIGURE 3 is a vertical view of the drive mechanism 10a to 16a, of FIGURE 1. This view clarifies the shape of a typical bracket 12 to hold the sensing wheels 13a and the drive wheels 14a in proper relationship with respect to the film and to the flange of the reel 10a. The bracket must be shaped to fit around the flange since the sensing wheel is on one side of the flange and the driving wheel is on the other side. The bracket assembly must have enough freedom of motion to be completely clear of the flange when the reel, which is interchangeable, is being removed.

The size of the bracket assembly, and the speed and power of the motor should, of course, be in accordance with the size of the reel, the size and type of film, and the desired speed of winding or unwinding. The difference between the speeds of rotation of the two friction drive wheels will also be a function of the size and strength of the film and, actually, need provide only enough tension to preclude the possibility of "spilling" and to provide an even, smooth winding of the film on the take-up reel.

What is claimed is:

1. An apparatus for winding elongated film from a feed reel to a take-up reel comprising a first reel having a flange whose external surface forms a plane perpendicular to the axis of rotation of said first reel;
   a second reel having a flange whose external surface forms a plane perpendicular to the axis of rotation of said second reel;
   a first, friction-drive wheel engaging said external surface of said first reel;
   a second, friction-drive wheel engaging said external surface of said second reel;
   a first mechanism for maintaining the radial position of said first friction-drive wheel in alignment with the outer layer of said elongated film on said first reel;
   a second mechanism for maintaining the radial position of said second friction-drive wheel in alignment with the outer layer of said elongated film on said second reel; and means for rotating said first, friction-drive wheel at a first speed to drive said first reel as a feed reel and said second, friction-drive wheel at a second speed, greater than said first speed, to drive said second reel as a take-up reel.

2. In an apparatus as in claim 1, means for reversing the direction of rotation of said means for rotating said first and second friction-drive wheels and causing said second friction-drive wheel to rotate at said first speed to drive said second reel as a feed reel and said first friction-drive wheel to rotate at said second speed to drive said first reel as a take-up reel.

3. An apparatus as in claim 1 wherein said means for rotating said first and second friction-drive wheels comprises
   a first, variable-speed pulley connected to rotate said first, friction-drive wheel;
   a second, variable-speed pulley connected to rotate said second, friction-drive wheel;
   a motor, having a drive shaft;
   a third pulley mounted on said drive shaft of said motor;
   a fourth pulley mounted on said drive shaft of said motor;
   a cam positioned between said first and said second, variable-speed pulleys for changing the effective diameters of said first and said second, variable-speed pulleys;
   said cam having a first position wherein the effective diameter of said first pulley is greater than the effective diameter of said second pulley, and a second position wherein the effective diameter of said second pulley is greater than the effective diameter of said first pulley;
   a first drive belt coupling said first and third pulleys;
   a second drive belt coupling said second and fourth pulleys;
   a switch for reversing the direction of rotation of said motor; and a lever arm coupled to said cam for moving said cam between said first and second positions, said lever arm connected to said switch to provide a first direction of rotation of said motor in said first position and a second direction of rotation of said motor in said second position;
   said friction-drive wheel of the effective take-up reel, thereby, always being connected to the pulley having the smaller diameter.

References Cited by the Examiner

UNITED STATES PATENTS

| 2,821,576 | 1/58 | Gaubert | 242—55.13 |
| 2,971,717 | 2/61 | Mitchell et al. | 242—55.13 |

FOREIGN PATENTS 739,381  10/55  Great Britain.

MERVIN STEIN, *Primary Examiner.*

RUSSELL C. MADER, *Examiner.*